United States Patent [19]
Nanbu

[11] Patent Number: 6,126,103
[45] Date of Patent: Oct. 3, 2000

[54] REEL FOR FISHING

[75] Inventor: Kazuya Nanbu, Saitama, Japan

[73] Assignee: Daiwa Seiko, Inc., Tokyo, Japan

[21] Appl. No.: 09/267,628

[22] Filed: Mar. 15, 1999

[30] Foreign Application Priority Data

Mar. 13, 1998 [JP] Japan .................................. 10-063268

[51] Int. Cl.[7] .................................................. A01K 89/00
[52] U.S. Cl. ........................................... 242/223; 242/305
[58] Field of Search ..................... 242/223, 305, 242/310, 311, 323; 43/4, 20

[56] References Cited

U.S. PATENT DOCUMENTS

| | | | |
|---|---|---|---|
| 5,236,147 | 8/1993 | Kaneko | 242/309 X |
| 5,560,560 | 10/1996 | Hirose | 242/223 |
| 5,639,038 | 6/1997 | Hirose | 242/223 |

FOREIGN PATENT DOCUMENTS

| | | | |
|---|---|---|---|
| 404079828 | 3/1992 | Japan | 242/305 |
| 405111343 | 5/1993 | Japan | 242/305 |
| 406141742 | 5/1994 | Japan | 242/305 |
| 9124 | 1/1997 | Japan . | |

*Primary Examiner*—Donald P. Walsh
*Assistant Examiner*—Emmanuel M. Marcelo
*Attorney, Agent, or Firm*—Liniak, Berenato, Longacre & White

[57] ABSTRACT

A reel for fishing is provided with a measuring apparatus for measuring an actual fishing condition and a display for displaying the measured values obtained from the measuring apparatus. A circuit board for packaging electronic parts constituting the measuring apparatus is disposed separately from the display without superposing the display on the circuit board.

12 Claims, 5 Drawing Sheets

REEL FOR FISHING

BACKGROUND OF THE INVENTION

This invention relates to a reel for fishing so designed as to not only ensure a firm grip of the reel by making the whole reel compact but also have an improve external appearance.

In order to improve a catch of fish, many reels for fishing are now fitted with a measuring apparatus such as a length-of-fishline measuring apparatus for measuring the quantity of played-out fishline (length of fishline) on the basis of the number of revolutions of a spool detected by a number-of-revolutions detecting means or a fishline tension measuring apparatus for measuring the tension applied to the fishline. The measured values are, as described in Japanese Patent Laid-Open Publication Hei-9-124 or as shown FIG. 7, displayed on a digital display 5 or an LCD display (not shown) on a box-like control unit 3 fitted in a reel body 1.

Furthermore, the control unit 3 is so constructed that as shown in FIG. 8, the liquid crystal display portion 5a of the digital display 5 is superposed on a circuit board 9 for packaging CPU constituting a measuring means, and an electronic part such as memory.

The control unit 3 also includes a protective panel 5a covering the liquid crystal display portion 5a and a button-shaped battery 11 packaged on the circuit board 9, whereby the digital display 5, the electronic part 7 and the like are operated.

If the circuit board 9 for packaging the electronic part 7 is thus mounted in the control unit 3 in such a way that the digital display 5 is superposed on the circuit board 9, however, the control unit 3 provided in the upper portion of the reel body 1 will become thicker, which results in causing the control unit 3 to protrude far from the outer periphery of the reel body 1, thus making the control unit 3 look unattractive. As the reel becomes large-sized in the diametric direction, there exists a problem arising from the fact that when the user actually goes fishing, the reel becomes difficult to grip.

Nevertheless, almost no attempts have heretofore been made to tackle with the foregoing problems and as long as reels for fishing as mentioned above are concerned, there has been a demand for the whole reel to be lighter, smaller and thinner, that is, for small-sized lightweight reels, and taking steps to solve this problem has also been called for.

SUMMARY OF THE INVENTION

An object of the invention devised in the actual situation above is to provide a reel for fishing so designed as to not only ensure a firm grip of the reel by making the whole reel compact but also have an improve external appearance.

In order to accomplish the object above, a fishing reel according to the present invention is fitted with a measuring apparatus for measuring an actual setting of fishing and a display for displaying the measured values obtained from the measuring apparatus. The fishing reel is characterized in that a circuit board for packaging electronic parts constituting the measuring means is disposed separately from the display without superposing the display on the circuit board.

The reel for fishing is further characterized in that the display is disposed in the upper portion of a reel body and that the circuit board is fitted to the side portion of the reel body.

The fishing reel is further characterized in that the display and the circuit board are disposed in parallel to each other in the upper portion of the reel body.

According to the present invention, the reel body can be made smaller than before in the diametric direction since the circuit board for packaging electronic parts constituting the measuring means is disposed separately from the display without superposing the display on the circuit board in place of the conventional structure in which the digital display superposed on the circuit board is arranged in the control unit provided in the upper portion of the reel body. Consequently, an angler can grip the reel for fishing easily and securely when fishing while gripping both side portions of the reel.

The present disclosure relates to the subject matter contained in Japanese patent application No. Hei. 10-63268 (filed on Mar. 13, 1998), which is expressly incorporated herein by reference in its entirety.

DESCRIPTION OF THE PREFERRED EMBODIMENT

An embodiment of the invention will now be described with reference to the drawings.

Figure 1:
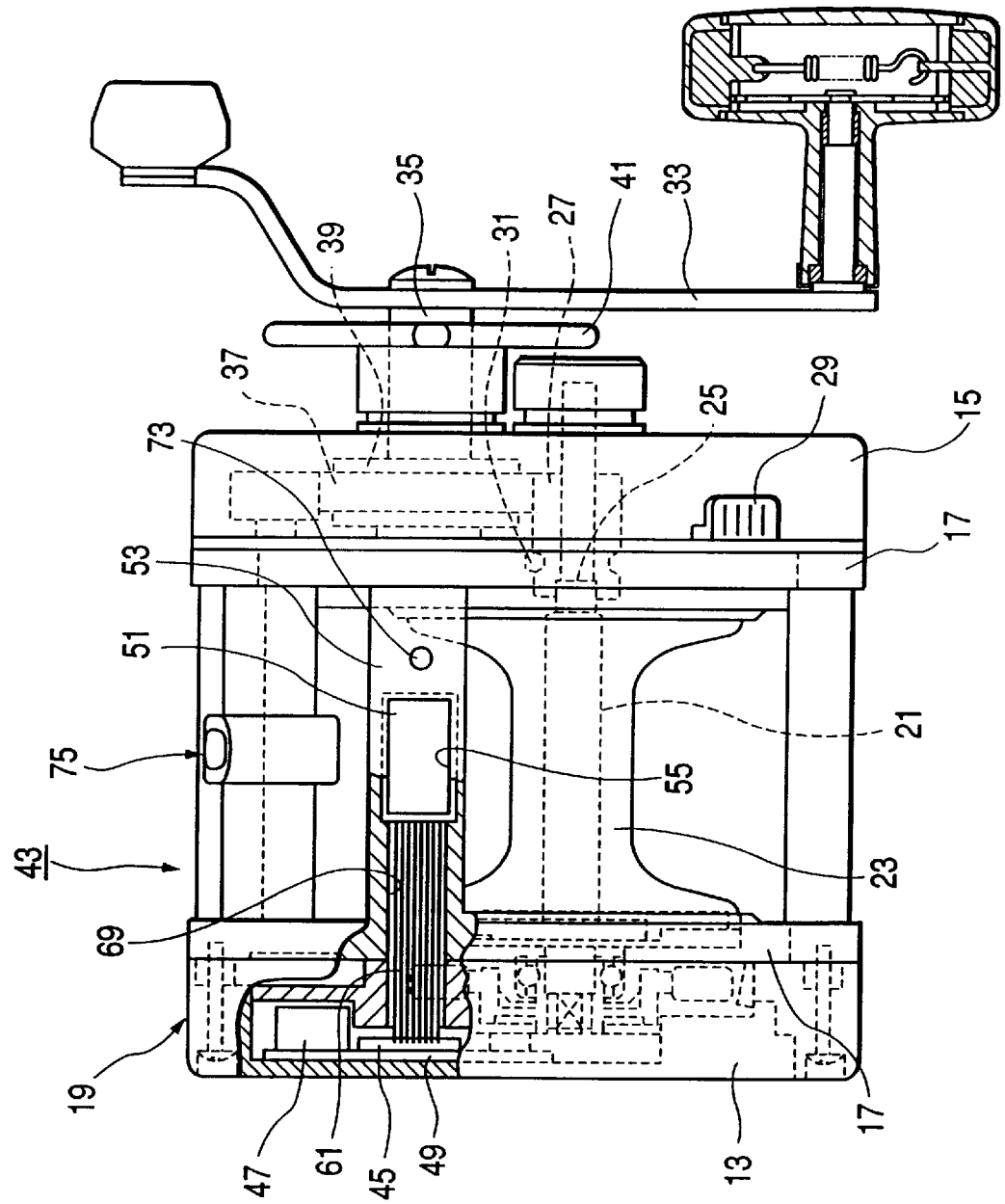
FIG. 1 is a partially cut-away top view showing major components of a reel for fishing according to a first embodiment of the present invention.

FIGS. 1–5 show a reel for fishing according to a first embodiment of the present invention. Referring to FIG. 1, reference numerals 13 and 15 denote side plates respectively attached to the left and right sides of a frame 17, the side plates 13 and 15 and the frame 17 forming a reel body 19. A spool 23 is rotatably supported between both the side plates 13 and 15 via a spool shaft 21.

A pinion gear 27 which is disengageable from a clutch portion 25 provided for the spool shaft 21 is mounted on the spool shaft 21 projectingly extended within the side plate 15 in a relatively rotatable and axially slidable. As in conventional reels, a spool-free condition is established for the spool 23 when the clutch engagement between the clutch portion 25 and the pinion gear 27 is released by means of a clutch plate 31 by operating a clutch lever 29 fitted to the side plate 15, so that a fishline (not shown) is played out of the spool 23 with a casting action.

In FIG. 1, reference numeral 33 denotes a handle 33 for winding the fishline, and a driving gear 37 engaging with the pinion gear 27 is relatively rotatably fitted to a handle shaft 35. Furthermore, the driving gear 37 and the handle shaft 35 are frictionally coupled by a conventionally known drag mechanism. In other words, the torque of the handle 33 is transmitted to the spool shaft 21 via the driving gear 37 and the pinion gear 27. As stated above, moreover, the torque of the handle 33 directed toward the spool 23 is cut off through the operation of switching the clutch OFF by means of the clutch lever 29, so that the spool 23 takes the spool-free condition. In this case, the drag force is regulated with a drag knob 41 fitted to the handle shaft 35.

Figure 2:
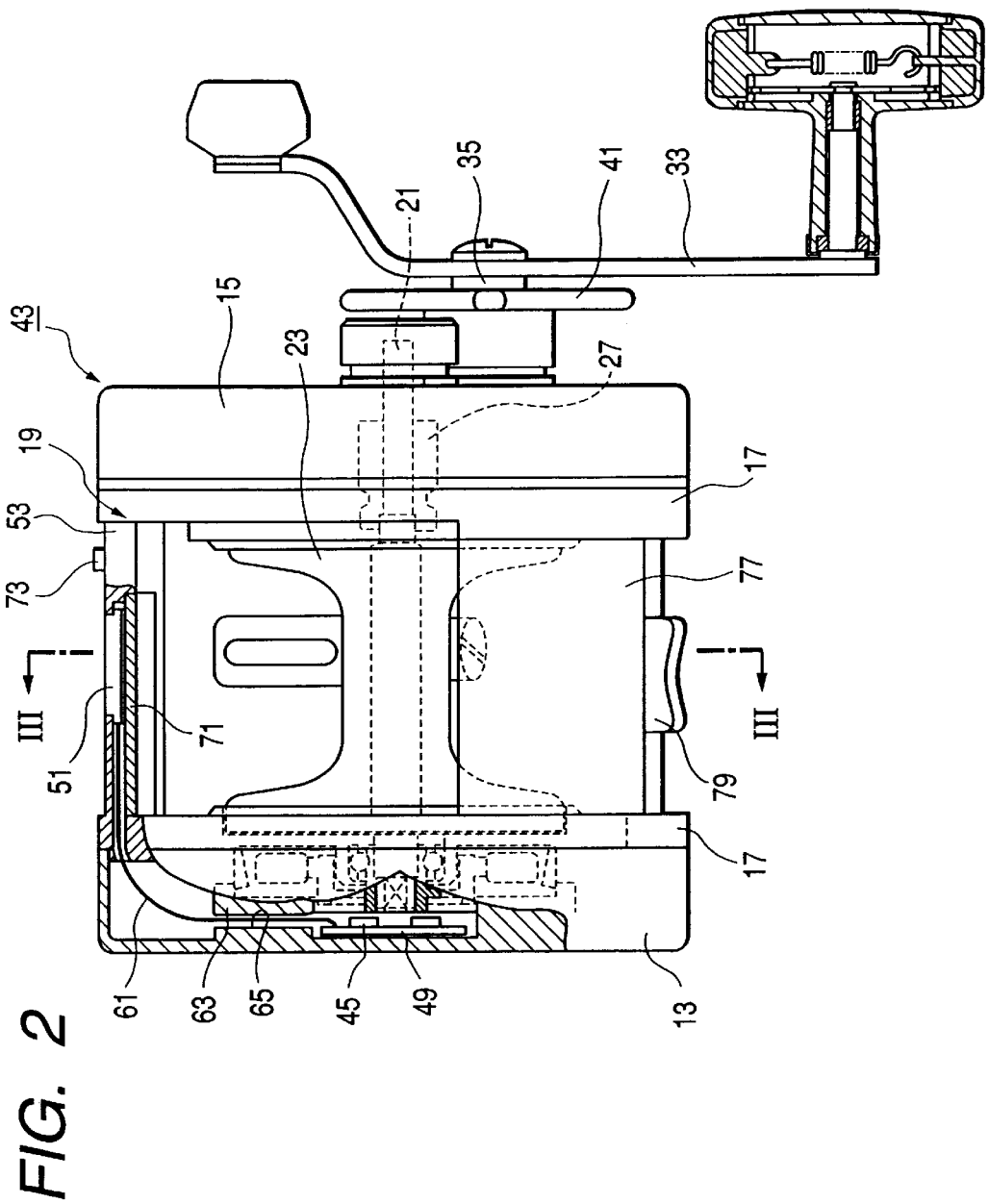
FIG. 2 is a partially cut-away rear view showing the major components of the reel for fishing shown in FIG. 1.
Figure 3:
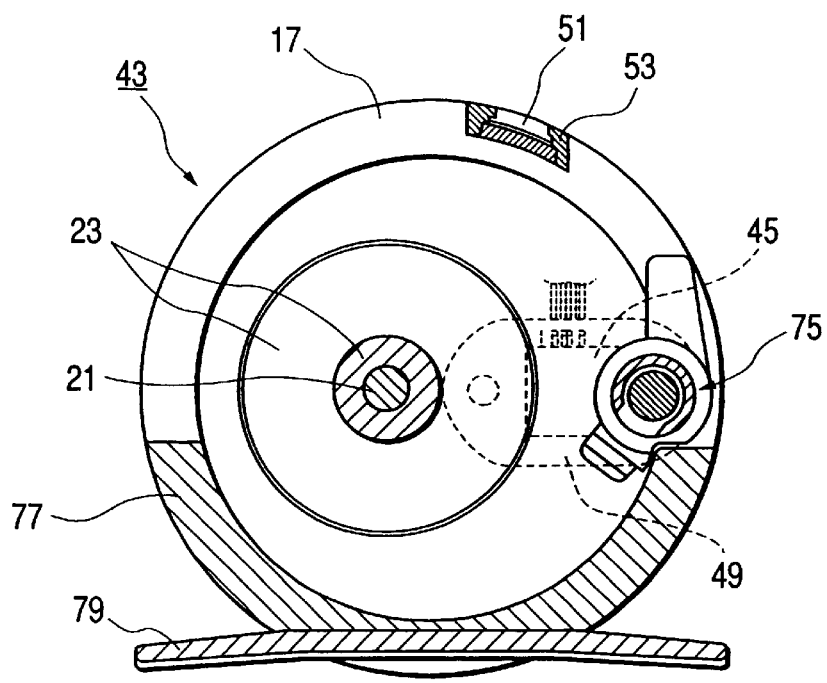
FIG. 3 is a sectional view taken along line III—III of FIG. 2.
Figure 8:
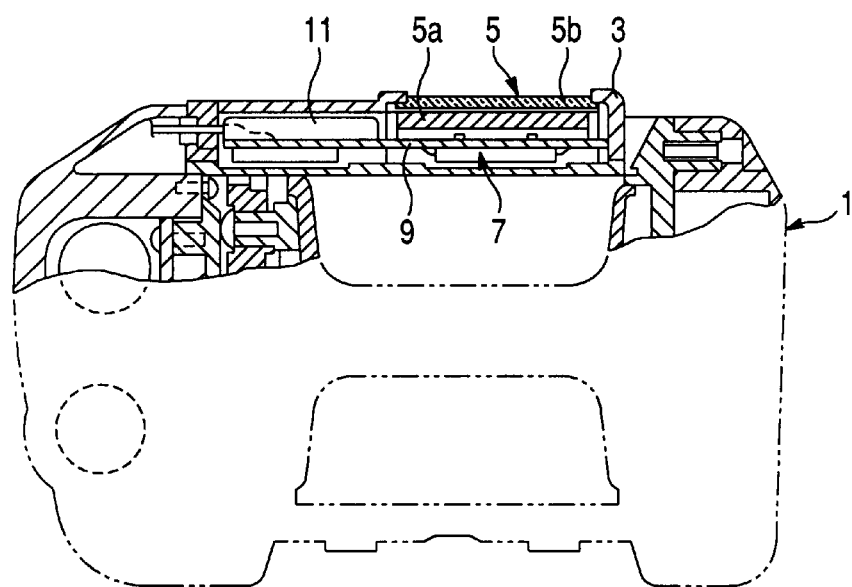
FIG. 8 is a partially cut-away rear view showing major components of the reel for fishing shown in FIG. 7.

A reel 43 for fishing according to this embodiment of the invention is also fitted with a fishline length measuring apparatus for measuring the quantity of played-out fishline. However, in place of the conventional structure in which the digital display superposed on the circuit board is arranged in the control unit provided in the upper portion of the reel body as shown in FIG. 8, the reel 43 for fishing according to this embodiment of the invention is fitted with a circuit board 49 for packaging a microcomputer 45 having CPU and memory, for example, together with a button-shaped battery 47 on the inner wall of one side plate 13 as shown in FIGS. 1–3. The microcomputer 45 is used for computing and displaying the length of fishline and controlling writing data.

Like the conventionally known fishline length measuring apparatus, the microcomputer 45 operates to measure the quantity of played-out fishline based on pulse signals indicative of the revolutions of the spool 23 detected by a number-of-revolutions detecting means (not shown) fitted to the reel body 19 in order to display the measured values on a digital display 51. This embodiment of the invention is characterized in that as shown in FIGS. 1–3, a thin-walled strut 53 is integrally formed in the upper portion of the frame 17 along the spool shaft 21 in conformity with the external configuration of the reel body 19 so that the digital display 51 is fitted in the strut 53.

Figure 4:
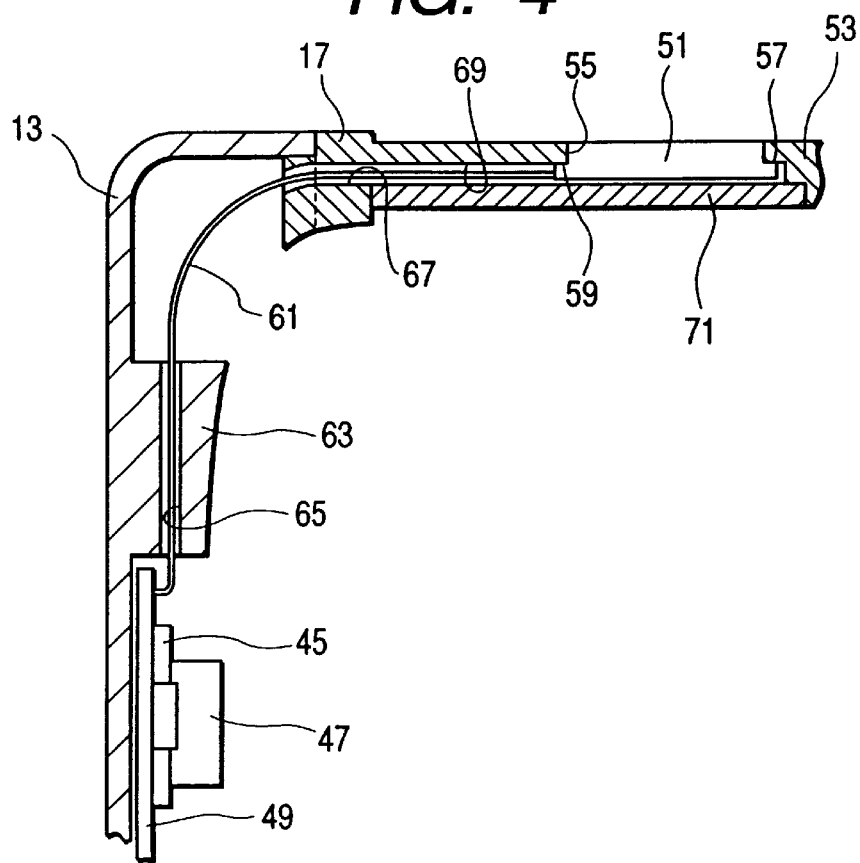
FIG. 4 is an enlarged sectional view of the structure of mounting a circuit board and a digital display.
Figure 5:
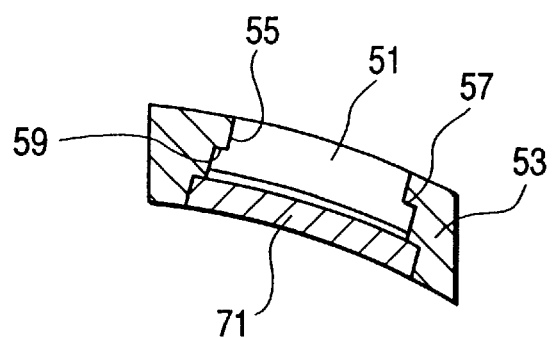
FIG. 5 is an enlarged sectional view of the structure of mounting the digital display.

FIGS. 4 and 5 show the structure of mounting a digital display mount. As illustrated, a rectangular fitting hole 55 is provided along the external shape of the digital display 51 in the substantially central portion of the strut 53. The digital display 51 is inserted into the fitting hole 55 from the back surface side of the fitting hole 55, and when a stepped portion 57 provided on the outer periphery of the display 51 is brought into contact with a stepped portion 59 provided on the inner periphery of the fitting hole 55, the digital display 51 is made flush with the surface of the strut 53.

The digital display 51 and the circuit board 49 are connected to each other by a tape-like conductor 61, which is passed through the guide hole 65 of a guide portion 63 provided on the side plate 13 and a guide hole 67 provided in the frame 17. Moreover, a guide groove 69 which is for use in leading the conductor 61 and communicates with the fitting hole 55 is formed on the back surface side of the strut 53. A cover 71 for covering an opening in the lower portion of the fitting hole 55 as well as the guide groove 69 is water-tightly fitted to the back surface side of the strut 53 in order to prevent the removal of the conductor 61 and the digital display 51.

In FIG. 1, reference numeral 73 denotes a reset switch mounted on the strut 53 in the proximity with the digital display 51; and 75, a conventionally known level winder mechanism. As in the conventional art, the reset switch 73 is commonly used as an ON switch for starting the microcomputer 45, the digital display 51, the number-of-revolutions detecting means and the like. The measured value of the fishline length displayed on the digital display 51 is reset to 0.0 m by operating the reset switch 73.

In FIG. 3, reference numeral 77 denotes a cover arcuate in section, which is integrally formed on the lower portion of the frame 17 along the external configuration of the reel body 19. A reel leg 79 is fitted to the cover 77.

As the reel 43 for fishing is thus constructed according to this embodiment of the invention, the microcomputer 45, the digital display 51 and like are started by operating the reset switch while both side portions of the reel 43 for fishing are gripped. When the clutch is switched to the OFF state by operating the clutch lever 29, the spool 23 is caused to establish the spool-free condition and the fishline is played out with the casting action. Then, the revolutions of the spool 23 are detected by the number-of-revolutions detecting means and inputted to and computed by the microcomputer 45. Since the quantity of played-out fishline obtained from the computed results is displayed on the digital display 51, an angler is only needed to switch the clutch ON by operating the clutch lever 29 at a desired depth while looking at the display.

When the handle 33 is operated while sensing a bite, the fishline is wound on the spool 23. In place of the conventional arrangement in which the digital display superposed on the circuit board incorporating the electronic parts including the microcomputer and the like is formed in the control unit provided in the upper portion of the reel body, an arrangement is made in the fishing reel of the present invention so that the circuit board 49 is mounted within the side plate 13, and the digital display 51 is provided in the thin-walled strut 53 formed in the upper portion of the reel body 19 separately from the circuit board 49. Consequently, the reel body 19 can be made smaller in comparison to the conventional one in the diametral direction and therefore the angler can grip the reel 43 for fishing easily and securely such that he or she grips both side portions of the reel 43 during fishing.

Since the reel body 19 according to this embodiment of the invention can be made smaller than the conventional one in the diametric direction, the whole reel becomes easy to grip and fishing operability is also improved.

Since the digital display 51 is arranged in the strut 53 formed in the upper portion of the reel body 19 to be flush with the surface configuration of the strut 53 (that is, any control unit protruded outside from the reel body 19 is not provided) according to this embodiment of the invention, the external appearance is further improved than the conventional example shown in FIG. 8. The invention is advantageous in that the freedom of designing the whole reel is increased by disposing the circuit board 49 in a location other than where the control unit is installed.

Figure 6:
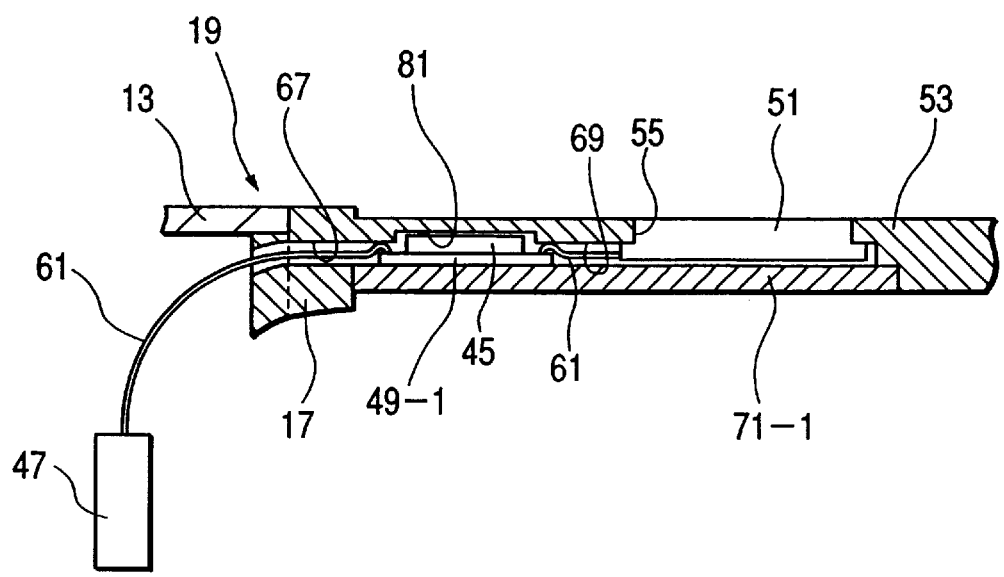
FIG. 6 is an enlarged sectional view of the structure of mounting the circuit board and the digital display in a reel for fishing according to a second embodiment of the invention.
Figure 7:
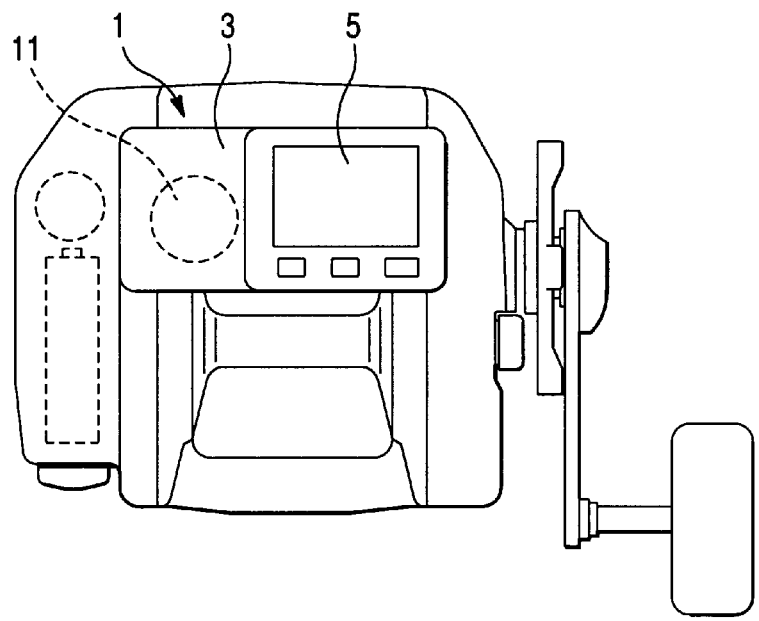
FIG. 7 is a top view of a conventional reel for fishing.

FIG. 6 is an enlarged sectional view of the structure of mounting the circuit board and the digital display of a reel for fishing according to a second embodiment of the present invention. In place of the structure of mounting the circuit board in the first embodiment of the invention, this embodiment includes the structure in which a button-shaped battery 47 is installed in the side plate 13, a recessed portion 81 for use in fitting a circuit board 49-1 for packaging the microcomputer 45 is formed in the mid-portion of the guide groove 69 formed on the back surface side of the strut 53, a circuit board 49-1 is installed in the recessed fitting portion 81 in parallel to the digital display 51, and the digital display 51 is covered with a cover 71-1.

Since an arrangement of any other component parts is similar to what has been described in connection with the first embodiment of the invention, the description thereof will be omitted.

Even in this case, the whole reel becomes easy to grip and fishing operability is also improved as the reel body 19 can be made smaller than the conventional one in the diametric direction and besides the external appearance is further improved than the conventional example shown in FIG. 8.

As set forth above, according to the invention, since the reel body can be made smaller than the conventional one in the diametric direction and since the circuit board for packaging electronic parts constituting the measuring means is disposed separately from the display without superposing the display on the circuit board, the display portion in the upper portion of the reel body is prevented from becoming thick and thus large sized. Moreover, the whole reel becomes easy to grip and the external appearance is improved further, the advantage of which is that the freedom of designing the whole reel is simultaneously increased.

What is claimed is:

1. A reel for fishing comprising:

a measuring device for measuring an actual condition of fishing;

a display for displaying a measured value obtained from the measuring device; and a circuit board, on which electronic parts are mounted to constitute the measuring device, wherein said display is disposed on said reel separately and spaced apart from the circuit board, without superposing the display on any part of the circuit board.

2. A reel for fishing according to claim 1, wherein the display is disposed in an upper portion of a reel body and the circuit board is mounted to a side portion of the reel body.

3. A reel for fishing according to claim 1, wherein the display and the circuit board are disposed in parallel to each other in an upper portion of the reel body.

4. The reel for fishing according to claim 1 further comprising:

a tape conductor connected to the display and the circuit board to form an electrical connection there between.

5. The reel for fishing according to claim 1, said reel further comprising:

a spool rotatable about a rotation axis, wherein no single radial line extending from the rotation axis commonly intersects both the circuit board and the display.

6. The reel for fishing according to claim 1, wherein said circuit board comprises a microcomputer and a battery mounted thereon, said microcomputer including a CPU and memory.

7. A reel for fishing comprising:

a reel main body having side plates and a strut extending between the side plates;

a spool rotatably supported between the side plates and adapted to receive a fishline thereon;

a fishing line measuring apparatus for measuring a quantity of the fishline released from the spool, the fishline measuring apparatus including:

a display installed in the strut;

a circuit board installed in one of the side plates; and a conductor connecting the display to the circuit board.

8. A reel for fishing according to claim 7, wherein at least a portion of the conductor is disposed within a guide groove formed in the strut.

9. A reel for fishing according to claim 7, wherein at least a portion of the conductor is disposed within a guide groove formed in the strut.

10. A reel for fishing comprising:

a reel main body having side plates and a strut extending between the side plates;

a spool rotatably supported between the side plates and adapted to receive a fishline thereon;

a fishing line measuring apparatus for measuring a quantity of the fishline released from the spool, the fishline measuring apparatus including:

a display installed in the strut;

a circuit board having a plurality of electrically interconnected components including a CPU mounted thereon, said circuit board being installed in the strut, and located between the display and one of the side plates in a direction in which the strut extends; and a battery installed in the one of the side plates.

11. A reel for fishing according to claim 10, wherein an elongated guide groove is formed in the strut extending between the side plates, the reel further comprising:

a conductor connecting the display to the circuit board, the conductor having at least a portion thereof disposed within the elongated guide groove.

12. The reel for fishing according to claim 10, wherein no single radial line extending from a rotation axis of the spool commonly intersects both the circuit board and the display.

* * * * *